United States Patent [19]

Esposito

[11] Patent Number: 4,800,477
[45] Date of Patent: Jan. 24, 1989

[54] DIGITALLY CONTROLLED SWITCH-MODE POWER SUPPLY APPARATUS EMPLOYING QUANTIZED STORED DIGITAL CONTROL SIGNALS

[76] Inventor: Anthony Esposito, 159 Connetquot Rd., Oakdale, N.Y. 11769

[21] Appl. No.: 124,076

[22] Filed: Nov. 23, 1987

[51] Int. Cl.⁴ .......................................... H02M 3/337
[52] U.S. Cl. ....................................... 363/17; 363/56; 363/98
[58] Field of Search ................... 363/17, 26, 56, 98

[56] References Cited

U.S. PATENT DOCUMENTS

| 4,631,653 | 12/1986 | Small | 363/17 |
| 4,748,550 | 5/1988 | Okado | 363/17 |

FOREIGN PATENT DOCUMENTS

| 2916833 | 11/1980 | Fed. Rep. of Germany | 363/26 |
| 190281 | 11/1983 | Japan | 363/26 |
| 995227 | 2/1983 | U.S.S.R. | 363/17 |
| 1062672 | 12/1983 | U.S.S.R. | 363/26 |

OTHER PUBLICATIONS

H. Wurzburg, "Regulator Performs Symmetry Correction in a Push-Pull Switching Power Supply", Electr. Design, 19, vol. 26, pp. 142-144, Sep. 13, 1978.

Primary Examiner—William H. Beha, Jr.
Attorney, Agent, or Firm—Arthur L. Plevy

[57] ABSTRACT

There is described a control circuit for use with a switching-mode power supply which circuit operates to store the duration of the last drive pulse and to control the next drive pulse so that it is prevented from exceeding the stored value by a given increment. In this manner the increment is selected such that one maintains close drive symmetry for the output drive transistors in all modes of operation. According to the operation, a given number of cycles are required before a minimum drive pulse to an output transistor can become a maximum. Thus, one never exceeds the duty cycle or the drive symmetry between the drive signals in a push-pull switch mode power supply by more than a predetermined increment. This assures complete drive symmetry and hence results in increased power supply efficiency while preventing the undesirable saturation of the output transformer.

14 Claims, 1 Drawing Sheet

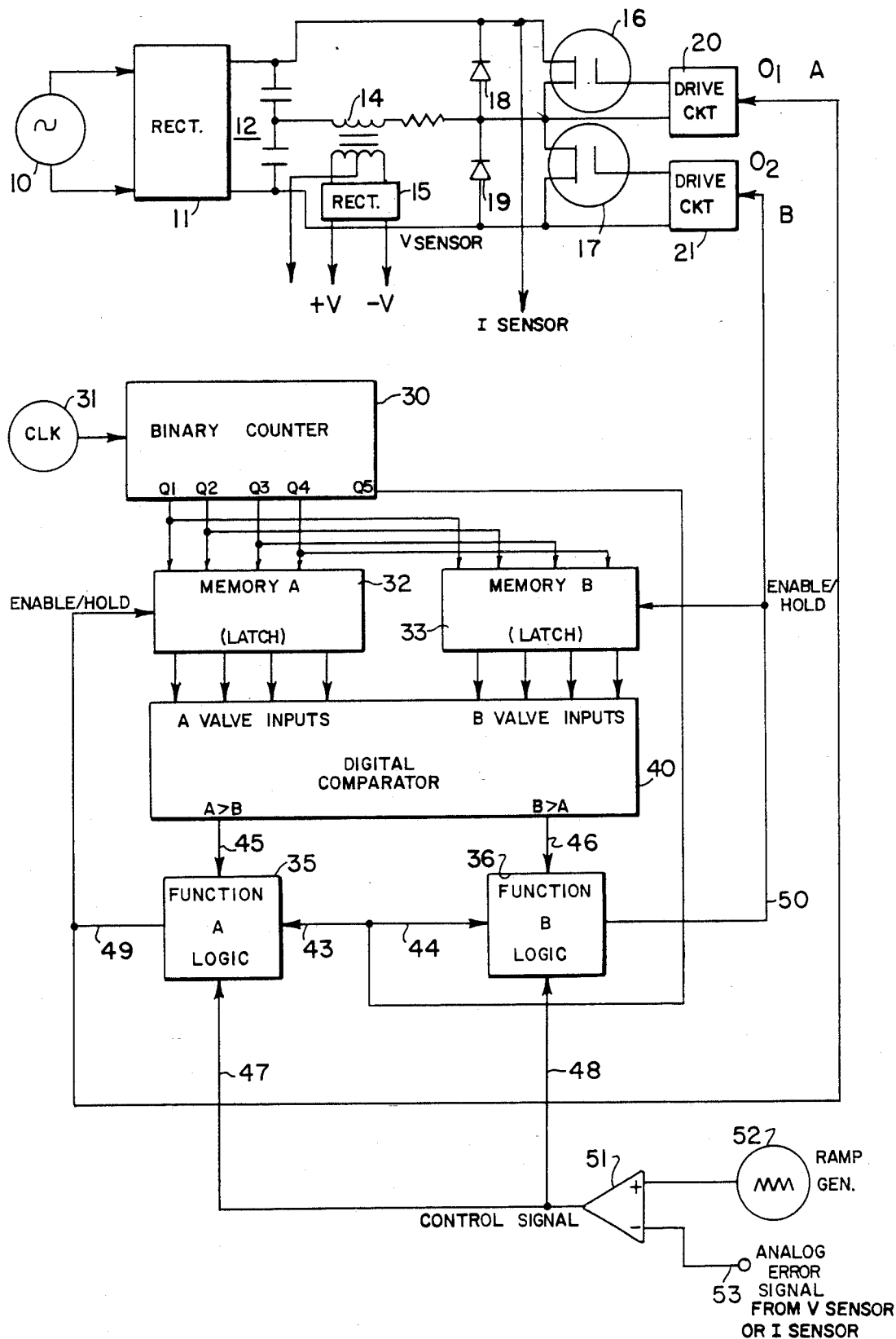

DIGITALLY CONTROLLED SWITCH-MODE POWER SUPPLY APPARATUS EMPLOYING QUANTIZED STORED DIGITAL CONTROL SIGNALS

BACKGROUND OF THE INVENTION

This invention relates to a switch-mode power supply (SMPS) apparatus and more particularly to a system for controlling the operation of such a supply.

Switch-mode power supplies (SMPS) are well known in the art. Supplies of this type operate to control power by varying pulses applied to gate the output of the supply and control the switching thereof. The variation employed may involve the duration or width, phase, magnitude, frequency or quantity of the pulse or combinations of these parameters. The output voltage may be controlled as a function of the input voltage, output load variations or other factors. However, in each case it is of critical importance that the relationship among switching pulses be precisely controlled. This control is made more important due to factors associated with non-linearities and temperature drift in the control loop.

For example if a switch mode power supply uses two or more switches which operate in a push-pull fashion to control the application of power to an output stage, it is important not to allow substantial differences in the duty cycle of each switch. This is particularly important where the output stage employs an output transformer as is invariably present since an undesired DC offset in the output transformer may develop causing premature saturation. Thus, when such differences are present and a DC offset develops an unsymmetrical flux density within the transformer will result causing saturation to more rapidly occur in one quadrant or another.

As indicated, switch-mode power supplies are well known and are advantageously employed to decrease size and weight in power supply circuits. Examples of such devices may be found in *Principles of Solid State Power Conversion* by Ralph E. Tarter, published by Howard W. Sams & Co., Inc., 1985. See for example Chapter 14 entitled "Regulated Power Supplies".

An understanding of push-pull circuitry, may be obtained by reference to U.S. Pat. No. 3,465,231 entitled TRANSFORMERLESS CONVERTER-INVERTER issued on Sept. 2, 1969 to R. L. Hyde. This patent shows an inverter circuit which utilizes a complementary Darlington transistor drive circuit which according to the description provides more efficient operation than the conventional circuit.

U.S. Pat. No. 4,020,361 entitled SWITCHING-MODE POWER CONTROLLER OF LARGE DYNAMIC RANGE issued on Apr. 26, 1977 to L. R. Suelzle. This patent describes the timing sequences of switching the power transistors in a switching mode power supply. The sequence utilizes pulses of short time duration as applied to the transistors to allow the transistor to quickly recover during the changing of states as from On to Off and vice versa.

U.S. Pat. No. 4,095,128 entitled PUSH-PULL SWITCHING CIRCUIT WITH MINORITY CARRIAGE STORAGE DELAY issued on June 13, 1978 to H. Tanigaki. This patent describes another technique for driving a push-pull switching circuit whereby the transistors are controlled by a pair of AND gates. The AND gates are operated by a flip-flop, and each gate is connected to the opposite transistor. The technique prevents simultaneously conduction of the transistors in such a power supply.

Other patents such as U.S. Pat. Nos. 4,213,103 and 4,266,268 describe switching circuits for controlling such power supplies. These circuits are concerned with the Off and On commands to the output switching stages. In any event, as one can ascertain, there is a great deal of prior art concerning switch-mode power supply circuits, and the prior art is cognizant of many of the problems including the above-described problem.

As briefly indicated above, in such power supplies where one employs two or more output switching transistors which operate in a push-pull mode or the like and are conventionally coupled to a drive transformer, it is important not to allow substantial differences in duty cycles to occur. This control must be maintained despite the presence of non-linearities and temperature drift in the circuit. If the duty cycle varies extensively then the drive transformer will appear to have a DC offset. A DC component on a drive signal may cause an nonsymmetrical flux density within the transformer causing premature saturation. Thus reduces the maximum output available with that particular transformer and decreases the efficiency of the power supply. Control which is not substantially independent of non-linearities and drift in the control loop frequently will result in damage to the switching transistors.

If symmetry between the drive input signals is tightly controlled, an overall increase in the efficiency and power density and hence a superior operation of the power supply will result. When digital counting techniques are employed in establishing the mechanism of control, non-linearities and temperature drift in a control loop may be obviated as problems.

It is therefore an object of the present invention to provide apparatus for controlling the duration of a switching signal within a value closely related to a previous value.

It is a further object of the present invention to provide digital control apparatus for maintaining control of a drive signal for switching transistors associated with a drive transformer to assure controlled operation and provide programmable performance.

BRIEF DESCRIPTION OF THE PREFERRED EMBODIMENTS

In a switch-mode power supply circuit of the type employing a pulse width modulated (PWM) drive signal for providing an output frequency according to said drive signal which output frequency is applied to a drive transformer coupled to means for converting said drive signal to an output, the improvement therewith of apparatus for controlling said drive signal comprising means responsive to said drive signal for storing a condition of said signal; and means responsive to a next drive signal as applied to said circuit for controlling the same according to said stored value to assure that said next drive signal is conditioned always according to said stored value.

BRIEF DESCRIPTION OF THE DRAWING

The drawing is a detailed block diagram of a preferred embodiment of switch-mode power supply and control apparatus according to this invention.

DETAILED DESCRIPTION OF THE DRAWING

Referring now to the drawing, there is shown a block diagram, partially in schematic form, of a switch-mode power circuit and control apparatus according to this invention.

The switch-mode power supply illustrated in the drawing, as indicated, is typically energized from a suitable source of AC potential 10 which may for example take the form of main power lines. As such, the AC power line or AC source 10 is applied to the input of a rectifier circuit 11 which may take any of the conventional and well known forms of rectifier configurations. The rectifier circuit 11 produces an output DC voltage across output capacitors designated by the reference numeral 12. A center tap between the capacitors 12 is coupled to one end of a primary winding of a transformer 14 whose secondary winding is coupled to a typical rectifier circuit 15 to produce a desired output voltage designated as +V and −V. The other end of the transformer primary winding 14 is coupled through a resistor or inductor, as shown, to a pair of center tapped diodes 18 and 19. The diodes 18 and 19 serve to protect switching transistors 16 and 17, at the output thereof. The switching transistors 16 and 17 are shown by way of example as field effect devices (FET's). The switching transistors 16 and 17 are connected to operate in a conventional push-pull mode to develope a switch frequency output between their respective source-to-drain paths. The output of the switching transistors 16 and 17 selectively energize a primary winding 14 of the transformer to develop an AC signal at a desired switching rate. This AC signal is eventually rectified by means of a conventional rectifier 15 to produce the desired output voltage or voltages at the outputs indicated as +V and −V.

The switching or drive transistors 16 and 17 are conventionally coupled to input drive circuits 20 and 21 which may take the form of conventional biasing arrangements. As shown in the drawing, the drive circuits 20 and 21 receive outputs $\phi_1$ and $\phi_2$ of a digital control circuit to be described which produces two drive signals (A and B) for transistors 16 and 17. The two drive signals A and B are applied through input drive circuits 20 and 21 to the respective gate electrodes of the switching transistors 16 and 17. The A and B drive signals are developed, in accordance with the teachings of the instant invention, in a manner to prevent generation of non-symmetrical drive signals in the push-pull switch mode power supply. The A and B drive signals developed are also not subject to component non-linearities and temperature drift which might otherwise be present in the control loop. Thus, in this manner, the drive signals which are applied to transistors 16 and 17 via their gate electrodes are symmetrical and cause the output voltage to be symmetrical. This avoids introduction of a DC offset or component in the transformer 14 and many of the deleterious effects associated therewith.

The drive signals designated as A and B are essentially pulse width modulated signals which operate to drive the switching transistors 16 and 17 which are here arranged in a push-pull configuration. The drive signals to the switching transistors 16 and 17 are applied via the drive circuits 20 and 21 which, as well known to those of ordinary skill in the art, essentially comprise resistor, capacitor combinations to provide appropriate biasing for the switching transistors 16 and 17. Those of ordinary skill in the art will appreciate that the power supply configuration per se may be arranged in a push-pull, half-bridge, full-bridge or similar arrangement as the invention is applicable to any type of switch mode power supply configuration as well as switching applications having corresponding requirements.

The control apparatus, as plainly indicated in the drawing, includes a high frequency clock 31, a binary counter 30, memory latch means 32 and 33, function logic units 35 and 36 and a digital comparator 40. The high frequency clock 31 may taken the conventional form of a crystal controlled astable multivibrator having an exemplary frequency of 2 MHz. Clock circuits of this type for providing stable frequency outputs are well known in the art and many examples of suitable circuits are available. The clock 31 provides an input as shown to the binary counter 30.

The binary counter 30 may take any of the conventional forms of this well known class of device and is arranged in a typical counting configuration so as to provide a plurality of outputs each representing the receipt of a predetermined number of clock inputs. Here the binary counter 30 essentially produces five outputs designated respectively as as Q1 to Q5 in the drawing. The binary counter 30 counts clock pulses provided at a 2 MHz rate, for example, by the high frequency clock 31 and produces five output frequencies at the outputs designated Q1–Q5 which may, for example, be 1 MHz (Q1), 0.5 MHz (Q2), 0.25 MHz (Q3), 0.125 MHz (Q4) and 0.0625 MHz (Q5). The binary counter 30 typically produces each of the 5 frequencies at the outputs Q1 to Q5 wherein each output has a 50% duty cycle.

The outputs Q1–Q4 of the binary counter 30, which may take the form of a ripple counter or the like, are coupled respectively to the inputs of the first and second memory latch means 32 and 33. As shall be seen below, the four outputs Q1–Q4 of the binary counter 0.30 represents the four least significnt bits (1 MHz to 0.125 MHz) and are employed to measure the duration of the drive pulse A or B developed by each of the function logic units 35 and 36 and gated by the most significant bit Q5 (0.0625 MHz) in 15 evenly quantized steps. Thus, as also shall be seen below the instant invention forces a piecewise linearization quantized in 15 steps of any incoming signal to a time base in proportion to the switch frequency. The Q5 output of the binary counter 30 is connected as indicated to corresponding inputs of each of the function A and function B logic circuits 35 and 36.

The memory latch means 32 and 33 may take the conventional form of bistable latching circuits well known to those of ordinary skill in the art. Each of the memory latch means 32 and 33 receive as inputs thereto the Q1–Q4 outputs of the binary counter 30 and act, when enabled to receive these inputs from the binary counter 30 and to maintain these inputs at the outputs thereof connected to the digital comparator 40 until such time as each latch is reset. The enable input for the memory A latch means 32 is provided as an output from the function A logic unit 35 while the enable for the memory B latch means 33 is provided as an output from the function B logic unit 36. From an inspection of the drawing it will be apparent that the output of the function A logic unit 35 which enables memory A latch means 32 corresponds to the A drive signal provided to drive circuit 20 and switching transistor 16. Conversely the same output of the function B logic unit 36 which enables memory B latch means 33 is the B drive signal provided to the drive circuit 21 and switching transistor 17.

The function A logic unit 35 and the function B logic unit 36 may each take the form of conventional gate arrays which act in response to an appropriate portion of the Q5 output supplied to the switching input thereof and appropriate high or low gate conditions at the logic inputs thereto to provide a high at the output thereof for purpose of enabling the memory latch means 32 or 33 associated therewith as well as placing its respective switching transistors 16 or 17 in an On condition. Both the function A logic unit 35 and the function B logic unit 36 receive as one input the output from Q5 of the binary counter 30 which output serves to gate or enable each logic unit during opposite transitions associated with the duty cycle of the Q5 output of the binary counter 30. For example, the function A logic unit 35 may be gated On as a result of a negative transition of Q5 while function logic 36 will be gated On or enabled for a positive transition of Q5.

Thus, when a negative transition is present on conductor 43 function A logic unit 35 will be gated On while when a positive transition is present on conductor 44 function B logic unit 36 will similarly be gated On. If the remaining inputs to the function A logic unit 35 on conductors 45 and 47 are appropriate when the negative transition on conductor 43 appears an output will be developed on conductor 49. The output on conductor 49 will enable the memory A latch means 32 and provide the drive signal A to the switching transistor 16. Similarly, when the inputs on conductors 46 and 48 to the function B logic unit 36 are appropriate when a positive transition is present on conductor 44 an output will be provided on conductor 50 for purposes of enabling the memory B latch means and providing the B drive signal to the switching transistor 17.

Under these conditions it will be appreciated that whenever the function A logic unit 35 is producing an output on conductor 49, the $\phi_1$ signal applied to the switching transistor 16 will place this switching transistor in an On condition and the interval of that On condition, as measured by the Q1–Q4 outputs of the binary counter 30, is continuously being loaded into memory A latch means 32. Upon termination of the output of function A logic unit 35 on conductor 49, the switching transistor 16 will be gated Off and the duration of the previous period during which switching transistor 16 was in an On condition will be maintained in memory A latch means 32 and available to digital comparator 40 at the outputs thereof.

Similarly, whenever a high output is produced by the function B logic unit 36 during the presence of a positive transition of Q5 on input 44 and appropriate input levels on conductors 46 and 48, the B drive signal applied to the gate of switching transistor 17 will place the same in an On condition. Here the duration of that On condition, as measured by outputs Q1–Q4 of binary counter 30, will be continuously supplied to the memory B latch means 33. The interval information supplied to memory B latch means 33 from the Q1–Q4 outputs of the binary counter 30 will be continuously available at the outputs of memory B latch means 33 supplied to the digital comparator 40. Upon termination of the high output of the function B logic unit switching transistor 17 is gated Off and the duration of its On interval will be retained in memory B latch means 33 and supplied to the digital comparator 40 until such time as the latch is reset.

The function A logic unit 35 is enabled by the appearance of a negative transition on conductor 43 when a low level is present on conductor 45 and a high level is present on conductor 47. Similarly, the input conditions for the function B logic unit 36 causing the same to produce a high on output conductor 50 upon the appearance of a positive transition on input conductor 44 are such that a low must be present on conductor 46 and a high must be present on conductor 48.

The digital comparator 40 may take any of the conventional forms of this well known class of device. Here the digital comparator 40 receives two sets of 4 bit inputs and provides one output on each of the conductors 45 and 46 indicative, as indicated in the drawing, as to whether or not the A input is greater than the B input or the B input is greater than the A input. Whether the A input is greater than the B input is provided as an output on conductor 45 while whether the B input is greater than the A input is provided on conductor 46. Since a low on conductors 45 and 46 is required to properly enable both the function A and function B logic units 35 and 36 it will be appreciated that both the function A logic and function B logic units 35 and 36 are enabled in response to a not condition at the output of the digital comparator 40 connected thereto. Thus function A logic unit 35 is enabled upon the appearance of a negative transition on conductor 43 when the A inputs to the digital comparator 40 are not larger than the B inputs and conversely the function B logic 36 is enabled upon the appearance of a positive transition on conductor 44 when the B inputs to the digital comparator 40 are not larger than the A inputs.

The A inputs to the digital comparator 40 are provided, as indicated in the drawing, by the four outputs of the memory A latch means 32. Hence, the four A inputs to the digital comparator 40 will correspond to the present value of the outputs Q1–Q4 of the binary counter 30 when the memory 40 latch means 32 is enabled by a high on conductor 49 while the A inputs to the digital comparator 40 will correspond to the previously latched condition of memory A latch means 32 when a low level is present on conductor 49. Similarly, the B inputs to the digital comparator 40 will correspond to the outputs Q1–Q4 of the binary counter 30 when the memory B latch means 33 is enabled by the presence of a high on conductor 50 while the same will correspond to the four bit interval previously latched in memory B latch means 33 when a low is present on conductor 50.

This means, as will be readily appreciated by those of ordinary skill in the art, that when a high level is present on conductor 49 and the switching transistor 16 is in an On condition, the A inputs to the digital comparator 40 will correspond to that presently being measured by outputs Q1–Q4 of the binary counter 30 while the B inputs to the digital comparator 40 will correspond to a previously latched condition in memory B latch means 33 corresponding to the duration of the interval in which the switching transistor 17 was in an On condition. Conversely, when a high level is on conductor 50 and the switching transistor 17 is On the B value inputs to the digital comparator 40 will correspond to the duration interval presently being measured by the outputs Q1–Q4 of the binary counter 30 while the A inputs will correspond to the value previously latched in memory A latch means 32 when the switching transistor 16 was in an On condition.

The interval of measurement for the duration in which one of the switching transistors 16 or 17 is in an On condition is evenly quantized by the outputs Q1–Q4 of the binary counter 30 into 15 steps. The gating conditions for function A logic unit 35 and function B logic unit 36 as imposed by conductors 45 and 46 are such that low or an enabling condition is present on conductors 45 and 46 only when the duration of the drive signal A or B presently being produced is not greater than the latched value of the previous, alternate drive signal B or A produced.

The inputs to the function A and function B logic units 35 and 36, as applied to conductors 47 and 48, are supplied from the output of a comparator 51. As will be recalled, to be enabled by negative and positive transitions of Q5 as applied on conductors 43 and 44, respectively, the level present on the conductors 47 and 48 must be high. The comparator 51 may take the conventional form of an analog comparator having one input coupled to a ramp generator 52 while a second input thereto as indicated is connected to a terminal 53 annotated analog error signal. The analog comparator 51 is conventional and acts to provide a high at the output thereof connected to conductors 47 and 48 when the input thereto connected to ramp generator 52 exceeds the level from terminal 53.

The ramp generator 52 is a conventional device which acts in the well known manner to produce a reference ramp signal. The ramp generator 52 may typically be operated in synchronous with the output frequency of the binary counter 30 at the output annotated Q5 and is essentially synchronous with twice the output frequency of Q5. This typically may be achieved by utilizing clock 31 to develop a synchronous signal via the ramp generator 52. Ramp generators such as indicated by the ramp generator 52 are typically employed by prior art devices which operated in a current-mode to combat non-linearities at a wide duty cycle and the like. Here the ramp generator 52 may be employed to modify the enabling conditions on conductors 47 and 48 to periodically reset, as shall be seen below, the pulse widths of the A and B signals output by the function A and function B logic units 35 and 36 to a minimum value and thereafter allow such outputs to expand in a precisely controlled manner determined by the dead zone of the digital comparator 40 associated with A=B.

The remaining input to the comparator 51, as applied from the terminal 53, comprises an analog error signal. The function of the analog error signal is to provide a high input when the power supply monitoring circuitry (not shown) detects an over-error limit and a low input for an under-error limit condition. Thus, as will be readily understood by those of ordinary skill in the art, an analog error signal may be developed in the conventional manner from a comparator or the like which is employed to monitor the output of the power supply. Thus, the power supply output voltage, as annotated, +V and −V in the drawing may be compared with a reference voltage to produce a high signal if the output voltage exceeds the reference and a low signal if the output voltage does not exceed the reference value. Further, the output voltage may be sensed in other manners or, alternatively, the output current may be employed to develop the analog error signal.

All of these techniques are extremely well known to those of ordinary skill in the art and are conventional. In any event, the analog error signal applied to terminal 53 is compared by the comparator 51 to the present value of the output of the ramp generator 52 and a high is produced at the output of the comparator 51 on conductors 47 and 48 whenever an appropriate relationship therebetween is present to indicate that the function A and function B logic units 35 and 36 may continue generation of the driving pulses $\phi_1$ and $\phi_2$. However, whenever the width of the drive pulses $\phi_1$ and $\phi_2$ must be reset to a minimum or the analog error signal is inappropriate, a low level provided at the output of the comparator 51 will disable both function A and function B logic units 35 and 36.

In operation of the control apparatus illustrated in the drawing it will be seen that the function A logic unit 35 and the function B logic unit 36 produce drive pulses Q1 and Q2 to selectively gate On the switching transistors 16 and 17 at a frequency determined by the Q5 output of the binary counter 30. Thus, when properly enabled the function A logic unit 35 will provide drive pulse Q1 upon the occurrence of a negative transition on conductor 43 while the function B logic unit 36 will produce the Q2 drive pulse on conductor 50 upon the occurrence of a positive transition on conductor 44. Accordingly, the Q5 output of the counter 30 determines the frequency of the A and B drive signals in acting as a strobe to define when a particular phase of the drive signal is to be initiated.

Since the output developed by each of the function A and function B logic units 35 and 36 also acts to enable the respective memory A and memory B latch means 32 and 33, it will be seen that when highs are present on the conductors 47 and 48 the duration or width of the $\phi_1$ and $\phi_2$ pulses produced by the function A and function B logic units 35 and 36 will be strictly controlled in relation to the current width of the pulse being produced versus the width of the previous, alternate pulse produced. Thus, in operation, at the completion of the B drive signal its value, as measured by the binary counter 30 and more particularly outputs Q1-Q4 thereof, will be stored in the memory B latch means 33 and applied to the B inputs of the digital comparator 40. Thereafter, when a negative transition appears on conductor 43 the function A logic 35 will produce an output on conductor 49 which is applied as drive pulse $\phi_1$ to the drive circuit 20 and enables the memory A latch means 32. Since the memory A latch means 32 is enabled, the current width of pulse $\phi_1$, as measured by outputs Q1-Q4 of binary counter 30, will be applied to this active latch and the output of the active memory A latch means 32 will be continuously applied to the A value inputs of the digital comparator 40.

Under these conditions the digital comparator 40 acts to compare the present value or width of the A drive signal as provided to the drive circuit 20 to the width of the last B drive signal produced and the output of the function A logic unit 35 on conductor 49 will be produced so long as the level on conductor 45 is low indicating that the width of the A drive signal, as presently being measured by the binary counter 30 and applied to the digital comparator 40, is not greater than the width of the last B drive signal whose value was stored in the memory B latch means 33. The value of the A drive signal being generated by the function A logic unit 35 on conductor 49 will be terminated as soon as the value on conductor 45 goes high indicating that the width of this pulse is greater than the width of the B drive signal previously stored in the memory B latch means 33. Alternatively, a maximum value will occur when the Q5 output of the binary counter 30 undergoes a positive transition to gate the function B logic unit 36 On and hence this represents a maximum value for the value of the A drive signal. In addition, the width of the A drive signal will be terminated any time the input to the function A logic unit 35 on conductor 47 goes low where-upon the same may be set to a minimum value which would be stored in the memory A latch means 32 to control the width of the next B drive signal.

Precisely the same relation obtains when the Q5 pulse undergoes a positive transition to gate the function B logic unit 36 On and produce the B drive signal. Under these circumstances, memory B latch means 33 is active to supply the current value for the width of the B drive signal to the digital comparator 40 which compares this value to the previously stored value for the width of the A drive signal and will produce a low on the conductor 46 so long as the value of the B drive signal does not exceed the width of the previously produced A drive signal.

Since the outputs of the digital comparator 40 on conductors 45 and 46 have a dead zone where the value of A=B, it will be appreciated by those of ordinary skill in the art that in any given sequence of pulses an A drive signal can only exceed the width of a previous B drive signal by 500 nanoseconds. This results since the piecewise linearization into 15 steps accomplished by outputs Q1-Q4 of the binary counter will cause one of the outputs of the digital comparator 40 on conductors 45 or 46 to go high as soon as the width of the A or B drive signal currently being measured exceeds the value of the previous B or A drive signal stored. Those of ordinary skill in the art will also appreciate that through the use of more than 4 bits in counting, other parameters may be achieved. Furthermore, by modifying the outputs of the binary counter 30 supplied to the memory A and memory B latch means 32 and 33, control outputs may be employed which simply define the position of the leading and lagging edges of the next or other digital pulses to occur based upon a function or algorithm that is used to define the significance of the positions of the leading and lagging edges of the pulse that was previously stored. Similarly, the same type of modification may be employed to modify in time the relationship between the A and B drive signals generated and the On and Off times associated with the function A and function B logic units 35 and 36.

From the foregoing, those of ordinary skill in the art will appreciate that the memory A latch means 32 stores the duration of the $\phi_1$ or A drive signal which is currently being produced when the memory A latch means 32 is active due to the presence of an enable signal on conductor 49 and the last value of this signal once the pulse has terminated. This is also true of the memory B latch means 33 for the current value of a B drive signal being produced or the last value thereof which was generated. Whenever the value of an A or B drive signal currently being produced exceeds the value of the previously produced B or A drive signal then the function A or B logic unit 35 or 36 associated therewith is turned Off. Each time a new A or B drive signal is initiated, the memory A or memory B latch means 32 or 33 associated therewith is reset, in a conventional manner (not shown), and thereafter the timing of the pulse being produced, as measured by outputs Q1-Q4 of binary counter 30, is continuously supplied thereto as a 4 bit input.

As a result, it will be seen that the value of the pulse last produced to drive one of the switching transistors 16 or 17 is compared to the 4 bit value of the pulse presently being produced. As soon as the clocking exceeds the latch data then an active drive signal is gated Off independent of whether or not the control pulse width module commands it On or Off. Hence, in operation, during alternate phases of the Q5 output of binary counter 30, alternate drive signals A and B are gated and their duration is measured and maintained in the latch associated therewith.

The instant control circuit thereby forces a piecewise linearization which is essentially quantified in 15 steps. These steps are fixed with respect to the time base generated by clock 31 in proportion to the switching frequency which is the frequency developed by the binary counter 30 via the Q5 output. With the exemplary frequencies set forth, the output drive signal A cannot exceed the value stored in the memory B latch means 33 by more than 500 nanoseconds while the output drive signal B cannot exceed the value stored in the memory A latch means 32 also by more than 500 nanoseconds. This means that the drive symmetry of each pulse supplied to the drive circuits 20 and 21 will not vary with respect to adjacent pulses by more than 500 nanoseconds to insure that a high degree of drive symmetry is maintained. Essentially, the circuit operates to simply prevent the next cycle of operation from being more than 500 nanoseconds longer than the last cycle of operation.

In the foregoing manner the instant invention maintains extremely close symmetry in any push-pull or bridge drive circuit. The digital comparator 40 operated as described in connection with the function logic units 35 and 36 can reset the drive to a minimum pulse width at any time but it cannot force maximum pulse widths until each successive drive pulse has increased in increments limited to 500 nanoseconds. In this manner, 15 half cycles are required before a minimum drive pulse can become maximized in width. In essence, this forces the switching transistor to be critically damped within 250 microseconds so that one transistor cannot produce successive transients which would cause ringing or perturbations of the output supply filter circuits. It also means that no substantial DC offset can be produced.

It is understood that the above-described circuit can be operated with any number of output phases as for example 3 drive signals, and hence one can utilize the control circuitry with a three-phase power supply. In this instance, the ramp generator 52 would be made syncrhonous with three times the Q5 frequency output of counter 30 if this frequency remained as the period total for each phase. Hence, any number of output phases are possible and all may be balanced in an output duty cycle.

In particular the circuit can be fully implemented by existing integrated circuit configurations using conventional modules which are available. The functions provided by function A and B logic units 35 and 36 are also capable of being implemented by standard logic circuit configurations. As one can ascertain from the above description, the function performed by function A logic unit 35 produces a output signal A which is On and which loads memory A latch means 32 with the output of binary counter 30 only if the Q5 output from binary counter is low, the control signal from comparator 51 is high and the A value as stored in memory A latch means 32 as compared by digital comparator 40 is not greater than the B value previously stored. This logic function can be simply and reliably implemented by one skilled in the art using conventional integrated circuits.

In a similar manner the function which is performed by function B logic unit 36 produces an output drive signal B which is On and causes the memory B latch means 33 to be loaded with the binary counter output counter value only if Q5 output of binary counter is high, the control signal output from comparator 51 is high and the B value as stored is not greater than the A value. Thus, all of the above-described modules as shown for example in the Figure are capable of being implemented by ordinary and commercially available integrated circuits.

It is of course understood that there are many other techniques which can be employed to implement the above-noted structure. Hence, once can also implement the above-described circuitry with a programmable processor which would further allow a single circuit to be standardized and can be reconfigured digitally for any variation of line and load types. Such a microprocessor for example would be capable of precisely regulating multiple outputs in a synchronous manner or modify the drive because of input current to strongly minimize back EMF or to vary the switching frequency and duty cycle so that it is sychronous with any existing compatible product.

From the above it is of course understood that the operation as described relates to the control of duty cycle of pulses applied to the control electrodes of output switching transistors or output devices utilized in a switch-mode power supply. Once a particular phase as a drive phase is turned On, a latch begins clocking in the count value provided by that stage in regard to the pulse duration. If the active value exceeds by one count, the stored value of the other phase or if the signal comparator commands a shut-down then the latch governing the present stage that is being driven is reset thereby turning Off that drive phase and preventing latching of additional count values for that stage. Hence the final latch value represents a time indicative of the entire pulse duration. This stored pulse duration is then utilized to limit the next drive signal duration so that it cannot exceed the stored drive signal duration by more than a given increment which is relatively small. This assumes that both drive phases as applied to the switching transistors are relatively equal to thereby maintain drive symmetry as indicated above.

In any event, it will be understood that the circuit in regard to switch-mode power supplies has greater applicability in that one actually memorizes the past state of a condition used in a drive signal to determine the prsent state of a drive signal which is being presently applied to the circuit. In this manner the use of a memory which is a storage device to memorize a past condition and the ability of the circuit to modify a present condition is an extremely important innovation and can be applied to various other parameters associated for example with switch power supplies or other power devices in order to regulate the pulse duration, pulse width or various other parameters utlized in such circuitry to provide controlled output levels.

Those of ordinary skill in the art will appreciate that the instant invention admits of many modifications and adaptations. For example, the outputs of the binary counter 30 could be modified or supplied to other circuitry such as a microprocessor to enable the positions of leading and lagging edges of digital pulses for purposes of driving switching transistors 16 and 17 to be developed based upon the function of an algorithm that may be employed to define the significance of the positions of the leading and lagging edges of these pulses or pulses stored in memory. Similarly, the piecewise linearization employed through the use of the 4 least significant bits of counter 30 may be modified to suit various design applications. Therefore, it is manifestly intended that this invention be only limited by the claims and the equivalents thereof.

What is claimed is:

1. In a switch-mode power supply circuit of the type employing a pulse width modulated (PWM) drive signal for providing an output frequency according to said drive signal which output frequency is applied to a drive transformer coupled to means for converting said drive signal to a DC output, the improvement therewith of apparatus for controlling said drive signal comprising:

means responsive to said drive signal for quantizing said signal to provide a digital indication of said drive signal; memory means for storing said digital indication of said drive signal indicative of a condition of said signal in a first mode; means responsive to the next drive signal as applied to said circuit for controlling the same according to said stored digital value to assure that said next drive signal is conditioned always according to said stored value.

2. The switch mode power supply circuit according to claim 1, wherein said switch mode power supply is a push-pull power supply having first and second PWM drive signals for application respectively to drive inputs of first and second power drive stages having outputs coupled to said transformer.

3. The switch mode power supply circuit according to claim 2, wherein said condition stored for said drive signal is the duration of said first drive signal, with said next drive signal being said second drive signal with said condition being the duration of said second signal.

4. The switch-mode power supply circuit according to claim 1, wherein said means responsive to the next drive signal includes a digital comparator for comparing the condition of said next drive signal with said stored digital condition of said drive signal to provide an output when said conditions are different.

5. In a push-pull switch-mode power supply of the type employing first and second output drive stages each having an input for receiving a PWM drive signal for providing a push-pull frequency signal across a transformer, which signal is converted to a DC output, the combination therewith of apparatus for controlling the drive to said output stages, comprising:

means responsive to a first input drive signal as applied to said first drive stage for quantizing said signal to provide a digital indication of the duration of said signal and memory means for storing said digital indication of the duration of said signal, means responsive to the next input drive signal as applied to said second drive stage for controlling the same according to said stored digital value to assure that said next input drive signal is determined always according to the stored value.

6. The switch mode power supply according to claim 5, wherein said means responsive to the next input drive signal includes storage means for storing the duration of said next drive signal and comparison means for comparing said values as stored with the stored value of said first drive signal to vary the duration of said next input drive signal according to said comparison.

7. The switch-mode power supply according to claim 5, wherein said duration of said next input drive signal is varied according to a given increment indicative of a minimum desired offset between said durations.

8. Control apparatus for a switch mode power supply of the type employing first and second output drive stages coupled to a transformer including means associated with said transformer for providing a DC output voltage, said drive stages each having an input for receiving respective first and second drive signals for causing said stage to operate in a push-pull mode with said drive signals controlled in duty cycle to regulate said DC output voltage, comprising:

clock circuit means operative to provide a plurality of output frequencies each indicative of a given timing interval, first and second memory means each coupled to said clock circuit means and adapted when activated to store a timing interval according to said given intervals, comparison means having an input coupled to said first and second memory means and operative to compare the value stored in said first memory means with the value stored in said second memory means, control signal means responsive to said output voltage of said supply for providing a control signal when said output voltage varies from a reference level, first logic means coupled to said first memory means and responsive to said control signal and having an input coupled to said comparison means for providing a first output drive signal having a given duration during the presence of said control signal and for causing said duration to be stored in said first memory means during the presence of said first drive signal, second logic means coupled to said second memory means responsive to said control voltage and having an input coupled to said comparison means for providing a second output drive signal having a duration determined by the duration of said first signal as stored and for causing said duration of said second signal to be stored in said second memory during the presence of said second drive signal, whereby each successive drive signal is compared in duration with the last drive signal to thereby maintain close symmetry between said drive signals.

9. The switch-mode power supply according to claim 8, wherein said clock circuit means includes a high frequency oscillator having an output coupled to a binary counter for providing a plurality of outputs, said plurality of output frequencies each being a divided clock frequency.

10. The switch-mode power supply according to claim 9, further including means coupling one output of said counter to said first and second logic means for gating the same wherein the frequency of said drive signals is determined by said coupled counter output.

11. The switch-mode power supply according to claim 10, wherein said binary counter is a five-stage counter having four outputs coupled to four inputs of said first and second memory means and one output coupled to said first and second logic means.

12. The switch-mode power supply according to claim 8, wherein said first and second memory means are binary latches.

13. The switch-mode power supply according to claim 8, wherein said first logic means provides said first drive signal when said control signal is high, when said value stored in said first memory is less than said value stored in said second memory and during one cycle of said counter.

14. The switch-mode power supply according to claim 8, wherein said second logic means provides said second drive signal when said control signal is high, when the value stored in said second memory is less than the value stored in said first memory and during an opposite cycle of said counter.

* * * * *